United States Patent

Tsubuko et al.

[11] Patent Number: 5,952,048
[45] Date of Patent: *Sep. 14, 1999

[54] INK COMPOSITION AND RECORDING METHOD USING THE SAME

[75] Inventors: Kazuo Tsubuko, Numazu; Nobutaka Kinoshita, Mishima; Tsuyoshi Asami, Yokohama; Akihiko Gotoh, Susono; Kazuhiko Umemura, Shizuoka-ken; Kazuyo Mizuno, Numazu; Makoto Okawara, Tokyo, all of Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/898,387

[22] Filed: Jul. 22, 1997

Related U.S. Application Data

[63] Continuation of application No. 08/662,901, Jun. 12, 1996, abandoned, which is a continuation of application No. 08/491,419, Jun. 16, 1995, abandoned.

[30] Foreign Application Priority Data

| Jun. 17, 1994 | [JP] | Japan | 6-159205 |
| Aug. 29, 1994 | [JP] | Japan | 6-227274 |
| Oct. 28, 1994 | [JP] | Japan | 6-289055 |
| Dec. 16, 1994 | [JP] | Japan | 6-333881 |
| Feb. 23, 1995 | [JP] | Japan | 7-058264 |

[51] Int. Cl.$^6$ .............. B05D 5/06; C09D 11/02; C09D 11/10
[52] U.S. Cl. ............ 427/288; 427/466; 427/469; 427/485
[58] Field of Search ............ 430/112, 115, 430/116, 117; 523/160, 161; 427/466, 469, 485, 388

[56] References Cited

U.S. PATENT DOCUMENTS

| 3,058,914 | 10/1962 | Metcalfe et al. | 430/116 |
| 3,576,744 | 4/1971 | Sharrock et al. | 430/115 |
| 3,585,140 | 6/1971 | Machinda et al. | 430/116 |
| 3,703,400 | 11/1972 | Temai et al. | 430/112 |
| 3,776,849 | 12/1973 | Tellier | 430/112 |
| 3,779,924 | 12/1973 | Chechak | 430/115 |
| 3,850,830 | 11/1974 | Fukushima et al. | 430/115 |
| 4,019,993 | 4/1977 | Tamai et al. | 430/112 |
| 4,062,789 | 12/1977 | Tamai et al. | 430/115 |
| 4,301,227 | 11/1981 | Hotta et al. | 430/112 |
| 4,595,646 | 6/1986 | Tsubuko et al. | 430/115 |
| 4,830,945 | 5/1989 | Wong et al. | 430/115 |
| 4,880,432 | 11/1989 | Egan et al. | 430/115 |
| 4,880,720 | 11/1989 | Drappel et al. | 430/115 |
| 5,023,160 | 6/1991 | Drappel et al. | 430/115 |
| 5,030,535 | 7/1991 | Drappel et al. | 430/116 |
| 5,262,267 | 11/1993 | Takiguchi et al. | 427/469 |
| 5,384,225 | 1/1995 | Kurotori et al. | 430/112 |

FOREIGN PATENT DOCUMENTS

| 0745533 | 2/1970 | Belgium | 430/115 |
| 745533 | 2/1970 | Belgium | 430/115 |
| 0028031 | 8/1976 | Japan | 430/115 |
| 28031 | 8/1976 | Japan | 430/115 |

OTHER PUBLICATIONS

Derwent Abstract 91–153238/21.
Derwent Abstract 91–144305–20.

*Primary Examiner*—Peter A. Szekely
*Attorney, Agent, or Firm*—Cooper & Dunham LLP

[57] ABSTRACT

An ink composition contains a carrier medium and charged particles containing a coloring agent, which ink composition satisfies at least one condition of condition A or B: condition A that the specific charge quantity of the charged particles is in a range of 10 to 1,000 $\mu C/g$ with a positive or negative polarity; and condition B that the specific resistance of the ink composition is $10^{10}\Omega cm$ or more; and ink-jet recording methods using the ink composition are proposed.

14 Claims, 2 Drawing Sheets

INK COMPOSITION AND RECORDING METHOD USING THE SAME

This is a continuation of application Ser. No. 662,901, filed Jun. 12, 1996 (now abandoned), which is a continuation of application Ser. No. 491,419, filed Jun. 16, 1995 (now abandoned).

BACKGROUND OF THE INVENTION

1. Field of the Invention

The present invention relates to an ink composition for use in electrophotography, electrostatic printing and electrostatic recording, or for use in printing inks in general use, ink-jet printing inks, and paints; and a recording method using the ink composition by electrically charging the ink composition and ejecting the ink composition onto an electrically charged substrate.

2. Discussion of Background

In ink-jet recording systems in general use, a liquid or solid ink is ejected from a nozzle, a slit or a porous film and caused to impinge upon a sheet of paper, cloth or film to perform recording thereon.

Ink-jet printers are in general use because of the advantages over other printers that noise generated while in use is much smaller, the size thereof is more compact and the cost thereof is lower in comparison with other printers.

Furthermore, as a result of recent intensive research and development activities in this field, single-color ink-jet printers capable of printing black images with high quality on plain paper such as writing-paper and copy papers are also commercially available.

Examples of a recently proposed wet-type toner jet recording system are as follows:

(1) A printing system which applies a voltage with the same polarity as that of toner particles to a tip of a line head to produce an aggregate of the toner particles, and eject the aggregate therefrom for printing (PCT/AU92-00665); and (2) A printing system comprising a toner ejecting means, which is disposed near a development roller and an electrophotographic photoconductor with a development gap therebetween and deposits a wet toner from the surface of the development roller on latent electrostatic images formed on the photoconductor.

U.S. Pat. No. 3,060,429 discloses an electrostatic ink-jet printing system which electrostatically attracts a development liquid serving as an ink. This system comprises two pairs of electrodes, one pair being opening and closing electrodes for intercepting or controlling the jet flow of ink droplets, and the other pair being electrodes for adjusting the path of the ink-droplet ejection, and includes the steps of generating charged ink droplets, accelerating the ejection of the ink droplets from a nozzle which holds the ink therein towards a plate-shaped electrode, with the application of a high voltage between the nozzle and the plate-shaped electrode, and supplying ink droplets to a sheet of paper which is disposed in front of the plate-shaped electrode immediately before the ink droplets reach the plate-shaped electrode.

It is desired that an ink for use in an ink-jet printer satisfy the following requirements: (1) capable of forming images on paper, without image spreading and fogging, with uniformly high resolution and image density; (2) causing no clogging at a tip of an ink-ejection nozzle and constantly providing excellent ink-ejection response and stability; (3) having excellent drying characteristics on paper; (4) capable of forming images with high fastness; and (5) having excellent long-period preservation stability.

In order to meet these requirements, various studies have been made with respect to ink-jet printing inks, including studies on various additives and water-soluble organic solvents for use in ink-jet printing inks.

Japanese Patent Publication 62-11781 discloses various surfactants for an ink-jet printing ink; and Japanese Laid-Open Patent Application 1-25789 discloses the use of a block copolymer of ethylene oxide and propylene oxide for use in an ink-jet printing ink.

Furthermore, in a wet-type toner for use in conventional ink-jet printing systems, as a carrier medium for the wet-type toner, isoparaffin is mainly used; and as a coloring agent therefor, for instance, carbon black and organic pigments are used.

Conventional dry-type developers for use in electrophotography are generally prepared by kneading a coloring agent, a resin and a charge-controlling agent, and pulverizing the kneaded mixture to finely-divided particles with a particle size in a range of 5 to 10 $\mu$m.

Conventional wet-type developers for use in electrophotography are generally prepared by dispersing a non-aqueous resin dispersion and a coloring agent to prepare a dispersion of toner particles with a particle size in a range of 0.5 to 2 $\mu$m. Generally wet-type developers are capable of providing clearer images than dry-type developers.

When such a wet-type developer for use in electrophotography is prepared, a non-aqueous resin dispersion is employed in order to disperse a coloring agent such as a pigment in a solvent. As a resin for such a non-aqueous resin dispersion, an amphiphatic resin is generally used.

Such an amphiphatic resin is derived from a vinyl polymer, and as such amphiphatic resin, a graft polymer is mainly used. The use of such graft polymer, however, has the problems that when the graft polymer is produced, a relatively large amount of an ungrafted polymer, which is soluble in a non-aqueous solvent, is produced as a side product, and the dispersibility of a coloring agent is impaired by the thus produced ungrafted polymer, resulting in that precipitations are eventually formed in the course of a long-period preservation of the developer.

There have been proposed various non-aqueous resin dispersions for use in liquid developers for developing latent electrostatic images formed in electrophotography or for use in paints, and methods of producing such non-aqueous resin dispersions.

For instance, Japanese Patent Publication 62-3859 discloses a liquid developer for use in electrophotography comprising toner particles made of a resin which is prepared by allowing a natural-resin-modified thermosetting resin to react with a long-chain alkyl-group-containing monomer.

Such a non-aqueous resin dispersion is effective for improving the dispersion stability of a coloring agent, but does not have sufficient dispersion stability.

Japanese Patent Publication 56-10619 discloses a liquid toner which is prepared by the steps of synthesizing white latex particles with a size of 0.4 to 0.8 $\mu$m in a non-aqueous solvent, and dyeing the white latex particles with a dye such as Victoria Blue. This method, however, has the shortcomings that it is difficult to prepare a black toner and that the toner produced by this method is of a dye type and therefore images formed by the toner have low image density and low light resistance and fade easily when exposed to light.

An ink for ink jet printing which satisfies all of the previously mentioned five requirements has not yet been produced.

Several ink jet printers capable of producing full color images, are commercially available. However, when plain paper is used for the printing, faithful image reproduction cannot be performed by those ink jet printers because the drying performance of the inks for use with the printers are insufficient, high speed reproduction output cannot be attained, and inks with different colors tend to be mixed during full-color image formation.

Therefore, it is usually necessary that a special surface-treated paper be used for these printers, so that the printing cost is high and it is difficult to spread these printers for general use.

Conventional ink jet printing systems using a wet toner which contains an organic solvent have the shortcomings that the application of high voltage is required to eject the wet toner from an ejection head or from the surface of a development roller; the fixing performance of the ejected wet toner to a printing paper is poor; the obtained image density is low; and high image resolution is difficult to obtain.

SUMMARY OF THE INVENTION

It is therefore a first object of the present invention to provide an ink composition for ink jet recording which is free from the previously mentioned shortcomings of the conventional ink compositions, capable of performing ink jet printing with high density and high resolution on substrates made of a material such as paper, plastics or a metal, with excellent image fixing performance, by ejecting the ink composition with the application of a relatively low voltage thereto.

A second object of the present invention is to provide an ink jet recording method using the above-mentioned ink composition.

The first object of the present invention can be achieved by an ink composition comprising a carrier medium and electrically charged particles (hereinafter referred to charged particles) which comprise a coloring agent, which ink composition satisfies at least one condition of condition A or B: condition A that the specific charge quantity of the charged particles is in a range of 10 to 1,000 $\mu$C/g with a positive or negative polarity; and condition B that the specific resistance of the ink composition is $10^{10} \Omega$cm or more.

In this ink composition, the charged particles may have an average particle size of 0.01 to 10 $\mu$m and the melt viscosity of the ink composition when dried and heated to 120° C. may be in a range of 0.1 to 10,000 pa·sec.

Further, the carrier medium for use in this ink composition may be selected from the group consisting of silicone oil, fatty acid ester, fluorine-containing oil, aliphatic hydrocarbon and alcohol.

The coloring agent may here a surface layer comprising a resin or an oil.

The charged particles may further comprise at least one component selected from the group consisting of silicon-containing resin, olefin resin, rosin, rosin-modified resin, and a copolymer produced with any of components of the foregoing resins.

The shape of the charged particles may be spherical, fibrous or shapeless. In the present invention, the charged particles in any of these shapes may be used in a mixture thereof.

The charged particles may be toner particles prepared by the polymerization of a system comprising coloring agent, a polymerizable monomer and a non-aqueous solvent.

The coloring agent may be prepared by thermally reacting a dispersion system comprising a pigment and/or dye, a reactive active-hydrogen-containing silicone compound and an isocyanate compound dispersed in a non-aqueous solvent.

The second object of the present invention can be achieved by a recording method comprising the steps of electrically charging the above-mentioned ink composition and ejecting the ink composition from a pen-plotter nozzle onto an electrically charged substrate.

Alternatively, the second object of the present invention can be achieved by a recording method comprising the steps of electrically charging the above-mentioned ink composition to a predetermined polarity and ejecting the charged ink composition from an ink ejecting portion in the form of a nail, a nozzle or a line head, with the application of a voltage with a polarity which is the same as or opposite to the polarity of the charged ink composition to the ink composition.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
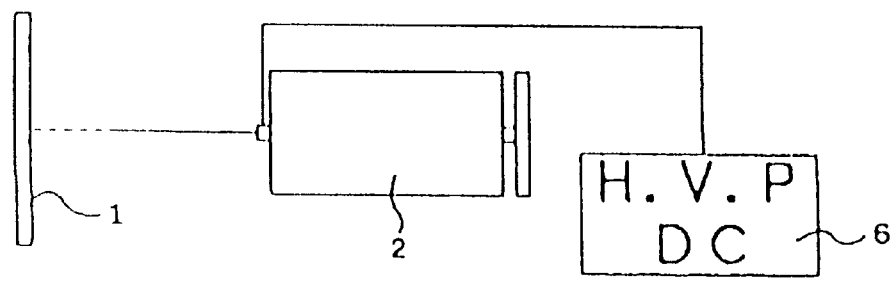
FIG. 1 is a schematic illustration of an ink-jet ejection test machine A.

The ink composition according to the present invention comprises a carrier medium and charged particles comprising a coloring agent, which ink composition satisfies at least one condition of condition A or B: condition A that the specific charge quantity of the charged particles is in a range of 10 to 1,000 $\mu$C/g, preferably in a range of 100 to 800 $\mu$C/g, with a positive or negative polarity; or condition B that the specific resistance of the ink composition is $10^{10} \Omega$cm or more, preferably in a range of $10^{11} \Omega$cm or more.

In the above condition A, when the specific charge quantity of the ink composition is less than 10 $\mu$C/g, the dot diameter of the ejected droplets of the ink composition increases, so that the printed dot diameter also increases and accordingly it is difficult to increase the resolution of images to be printed.

Furthermore, when the specific charge quantity of the ink composition is less than 10 $\mu$C/g, the image fixing performance of the ink composition is decreased.

On the other hand, when the specific charge quantity of the ink composition is more than 1000 $\mu$C/g, the image density obtained by the ink composition is decreased.

With respect to the necessary voltage to be applied to the ink composition for the ejection thereof, there is a tendency that the larger the specific charge quantity of the ink composition, the lower the necessary voltage to be applied to the ink composition for the ejection thereof, in other words, the smaller the specific charge quantity of the ink composition, the higher the necessary voltage to be applied to the ink composition for the ejection thereof.

Most of conventional liquid developers for use in electrophotography have a specific resistance of less than $10^{10} \Omega\text{cm}$ and the toner particles therefor have a specific charge quantity of less than 10 μC/g. In the case of electrophotography, it is difficult to obtain high quality images even when there is employed a liquid developer comprising toner particles with a specific charge quantity in a range of 10 to 1,000 μC/g to neutralize the potential of latent electrostatic images.

In conventional inks for ink-jet recording, dyes are dissolved in a dispersion medium so that the specific charge quantity (Q/M) of the particles of coloring agents cannot be obtained. In even conventional dispersion type inks for ink-jet recording, particles dispersed therein generally have low specific charge quantities, and the specific resistances of the inks are $10^8 \Omega\text{cm}$ or less.

The specific resistance and conductivity of an ink composition depend upon the kind, density and mobility of carriers for electroconduction in the ink composition. Therefore it is necessary to minimize the presence of ions working as charge carriers in the ink composition as much as possible. In order to do this, a carrier or dispersion medium and a coloring agent should be carefully selected, and, if necessary, should be purified to remove such ions therefrom.

In the present invention, it is preferable that the charged particles have an average particle size in a range of 0.01 to 10 μm, more preferably in a range of 0.03 to 5.0 μm.

When the average particle size of the electrically charged particles is more than 10 μm, the image fixing performance of the ink composition tends to become improper and the particles tend to precipitate, while when the average particle size thereof is less than 0.01 μm, the ejection performance of the particles tends to be degraded and therefore the voltage applied thereto has to be increased more or less and the ink composition when printed tends to spread on paper.

Further, it is preferable that the melt viscosity of the ink composition when dried and heated to 120° C. be in a range of 0.1 to 10,000 pa·sec, more preferably in a range of 10 to 5,000 pa·sec, since when the melt viscosity is in the range of 0.1 to 10,000 pa·sec, the ink composition can be uniformly ejected and the printed dot diameter is uniform. However, when the melt viscosity of the ink composition at 120° C. is less than 0.1 pa·sec, the dot diameter of the ejected ink droplets tends to be increased and accordingly the printed dot diameter is increased, so that it is difficult to increase the resolution of images to be printed; and the image fixing performance of the ink composition tends to be degraded.

On the other hand, when the melt viscosity of the ink composition at 120° C. is more than 10,000 pa·sec, the dot diameter of the ejected ink droplets tends to become non-uniform.

As the carrier medium for use in the present invention, there can be employed water, alcohols, aliphatic hydrocarbons, esters of fatty acids, fluorine-containing solvents and silicone oil.

Examples of water include distilled water, ion-exchanged water and tap water.

Examples of alcohols include ethyl alcohol, isopropyl alcohol, butanol, propanol, hexyl alcohol and nonylalcohol.

Examples of aliphatic hydrocarbons include hexane, heptane, octane, isododecane, and commercially available aliphatic hydrocarbons such as Isopar G, Isopar H, Isopar L, Isopar M, Isopar V (made by Exxon Chemical Japan Ltd.) and Shellsol-71 (made by Shell Petrochemical Co., Ltd.).

Examples of esters of fatty acids include esters of higher fatty acids such as isopropyl myristate, isobutyl myristate, hexyl myristate, isopropyl oleate and isobutyl octate.

Examples of fluorine-containing solvents include Fluorinart FC-40, 43 and Fluorinert-70, 77 (made by Sumitomo 3M Limited).

Examples of silicone oil include dialkyl silicone oil, cyclic polydialkyl silicone oil, methylphenyl silicone oil, methylhydrogen silicone oil and modified silicone oils such as reactive silicone oil and non-reactive silicone oil. Specific examples of the dialkyl silicone oil include dimethyl polysiloxane and dilauryl polysiloxane (made by SHIN-ETSU CHEMICAL Co., Ltd.), which are commercially available under the trademarks of KF96L-1, KF96L-5, KF995, KF994 and KF96L-20; and methylphenyl silicone oil which is commercially available under the trademarks of KF56 and KF58.

It is preferable that the carrier or dispersion medium for use in the present invention have a viscosity of 100 cP or less, more preferably a viscosity of 10 cP or less.

Examples of the coloring agent for use in the present invention include inorganic pigments such as Printex V, Printex U, Printex G, Special Black 15, Special Black 4, Special Black 4-B (made by Degussa Japan Co., Ltd.); Mitsubishi #44, #30, MR-11, MA-100 (made by MITSUBISHI CHEMICAL INDUSTRIES, LTD); Raben 1035, Raben 1252, New Spect 11 (made by Columbian Carbon Co., Ltd.), Reagal 400, Reagal 600, Black Pearl 900, 1100, 1300, Mogul L (made by Cabot Corporation); and organic pigments such as Phthalocyanine Blue, Phthalocyanine Green, Sky Blue, Rhodamine Lake, Malachite Green Lake, Methyl Violet Lake, Peacock Blue Lake, Naphthol Green B, Naphthol Green Y, Naphthol Yellow S, Naphthol Red, Lithol Fast Yellow 2G, Permanent Red 4R, Brilliant Fast Scarlet, Hansa Yellow, Benzidine Yellow, Lithol Red, Lake Red C, Lake Red D, Brilliant Carmine 6B, Permanent Red F5R, Pigment Scarlet 3B Indigo, Thioindigo Oil Pink and Bordeaux 10B.

The above coloring agents may be purified to increase the specific resistance of the ink composition.

The above-mentioned coloring agents are mixed with an oil, a resin or a varnish and the mixture is kneaded and crushed by use of a two-roller kneader or in a flusher to obtain flushed coloring agents with the surface thereof being treated with the resin or with other components.

The thus flushed coloring agents serve to increase the specific charge quantity of the charged particles, the specific resistance of the ink composition and the amount of solid components in the ejected ink composition.

Examples of a resin suitable for the treatment of the surface of the coloring agents in the above-mentioned flushing are rosin-modified resins, silicon-containing resin, acrylic resin, polyolefin and olefin copolymers.

It is preferable to add to the ink composition a non-aqueous silicon-containing copolymer to improve the dispersibility, charge control and image fixing performance of the ink composition and the specific charge quantity of the charged particles in the ink composition.

This non-aqueous silicon-containing copolymer can be prepared by polymerizing a polymerizable silicone compound with the following formula (I) and a monomer which is copolymerizable with the polymerizable silicone compound in the presence of an initiator in a non-aqueous solvent:

cross-linked polymer prepared by copolymerization of the silicone compound of formula (I) with a cross-linkable

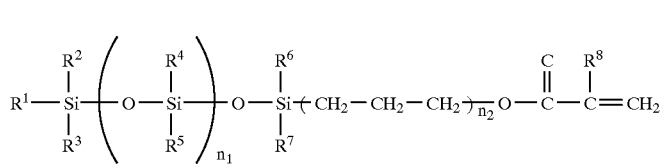

(I)

wherein each of $R^1$, $R^2$, $R^3$, $R^4$, $R^5$, $R^6$ and $R^7$ may be the same or different and is selected from the group consisting of $-C_nH_{2n+1}$ in which n is an integer of 1 to 10, $-OH$, $-COOH$, $-NH_2$, $-N(CH_2)_2$, $-N(C_2H_5)_2$, $-(CH_2)_2OH$, $-(CH_2)_3OH$, $-(CH_2)_2NH_2$, $-(CH_2)_2N(CH_3)_2$, $-(CH_2)_2N(C_2H_5)_2$, $-(CH_2)N(C_2H_5)_2$, $-(CH_2)_2COOH$, $-(CH_2)_3COOH$, halogen atom, monomer in combination with styrene, methyl methacrylate or n-butyl methacrylate.

Specific examples of the compound of the above-mentioned formula (I) are shown in TABLE 1:

TABLE 1

| | $R^1$ | $R^2$ | $R^3$ | $R^4$ | $R^5$ | $R^6$ | $R^7$ | $R^8$ | $n_1$ | $n_2$ |
|---|---|---|---|---|---|---|---|---|---|---|
| Comp. 1 | $-CH_3$ | $-CH_3$ | $-CH_3$ | $-CH_3$ | $-CH_3$ | $-CH_3$ | $-CH_3$ | $-CH_3$ | 1 | 1 |
| Comp. 2 | $-CH_3$ | $-CH_3$ | $-CH_3$ | $-CH_3$ | $-CH_3$ | $-CH_3$ | $-CH_3$ | $-CH_3$ | 10 | 1 |
| Comp. 3 | $-CH_3$ | $-CH_3$ | $-CH_3$ | $-CH_3$ | $-CH_3$ | $-CH_3$ | $-CH_3$ | $-CH_3$ | 64 | 1 |
| Comp. 4 | $-CH_3$ | $-CH_3$ | $-CH_3$ | $-CH_3$ | $-CH_3$ | $-CH_3$ | $-CH_3$ | $-CH_3$ | 131 | 1 |
| Comp. 5 | $-CH_3$ | $-CH_3$ | $-CH_3$ | $-C_6H_5$ | $-CH_3$ | $-CH_3$ | $-CH_3$ | $-CH_3$ | 1 | 1 |
| Comp. 6 | $-O-C(=O)-C(CH_3)=CH_2$ | $-CH_3$ | $-CH_3$ | $-CH_3$ | $-CH_3$ | $-CH_3$ | $-CH_3$ | $-CH_3$ | 1 | 1 |
| Comp. 7 | $-C_5H_{11}$ | $-C_5H_{11}$ | $-C_5H_{11}$ | $-C_5H_{11}$ | $-C_5H_{11}$ | $-C_5H_{11}$ | $-C_5H_{11}$ | $-H$ | 400 | 1 |
| Comp. 8 | $-C_2H_5$ | $-C_2H_5$ | $-C_2H_5$ | $-COOH$ | $-C_2H_5$ | $-C_2H_5$ | $-C_2H_5$ | $-CH_3$ | 1 | 3 |
| Comp. 9 | $-O-C(=O)-CH=CH_2$ | $-C_{10}H_{21}$ | $-C_{10}H_{21}$ | $-C_{10}H_{21}$ | $-NH_2$ | $-C_{10}H_{21}$ | $-C_{10}H_{21}$ | $-H$ | 300 | 1 |
| Comp. 10 | $-C_{10}H_{21}$ | $-C_{10}H_{21}$ | $-C_{10}H_{21}$ | $-C_{10}H_{21}$ | $-C_{10}H_{21}$ | $-C_{10}H_{21}$ | $-C_{10}H_{21}$ | $-CH_3$ | 1 | 1 |

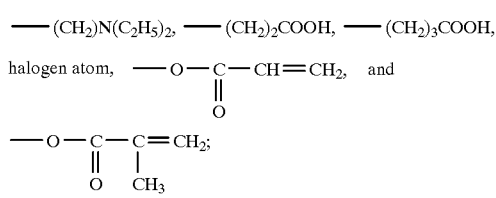

$R^8$ is $-H$ or $-CH_3$; $n_1$ is an integer of 1 to 500; and n2 i8 an integer of 1 to 10.

Examples of the monomer which is copolymerizable with the polymerizable silicone compound of formula (I) are monomers which are solvated in a nonaqueous solvent after the copolymerization, such as lauryl methacrylate, 2-ethylhaxyl methacrylate, etearyl methacrylate, and lauryl acrylate; and monomers having a polar group, such as methacrylic acid, fumaric acid, itaconic acid, maleic anhydride, glycidyl methacrylate, hydroxyethyl methacrylate and dimethylaminoethyl methacrylate, The non-aqueous silicon-containing copolymer may be a The charged particles in the ink composition of the present invention may be spherical, fibrous or shapeless in shape. However, it is preferable that the charged particles be fibrous or spherical. This is because it is considered that when the charged particles are fibrous, the aggregation force among the particles is so high that the stabilities of the ejection performance and image fixing performance of the ink composition are improved.

Furthermore, when the charged particles are spherical, the voltage applied for ejection of the ink composition can be decreased.

Other features of this invention will become apparent in the course of the following description of exemplary embodiments, which are given for illustration of the invention and are not intended to be limiting thereof.

REFERENCE EXAMPLE 1

Preparation of Resin No. 1

A mixture of the following components was placed in a three-necked flask and polymerized at 80° C. for 6 hours, whereby a polymer with a viscosity of 30.4 cPs was obtained with a conversion of 93%:

[Formulation]

| | |
|---|---|
| Isopar H (polymerization solvent) | 200 g |
| Vinyltoluene | 50 g |
| Lauryl methacrylate | 50 g |
| Dimethylaminoethyl methacrylate | 0.5 g |
| Azobisisobutyronitrile | 5 g |

The thus obtained polymer was repeatedly purified by use of methanol, Isopar H and toluene, whereby Resin No. 1 for use in an ink composition of the present invention was obtained.

The thus obtained Resin No. 1 is particularly useful for obtaining an ink composition with excellent image fixing performance.

REFERENCE EXAMPLE 2

Preparation of Resin No. 2

A mixture with the following components was placed in a three-necked flask and polymerized at 90° C. for 8 hours, whereby a polymer with a viscosity of 15 cPs was obtained with a conversion of 92%.

[Formulation]

| | |
|---|---|
| Silicone oil KF96L-1.5 (polymerization solvent) | 200 g |
| Salt of humic acid | 10 g |
| Reactive silicone (FM-0711) | 30 g |
| Styrene | 10 g |
| Maleic anhydride | 3 g |
| Benzoyl peroxide | 3 g |

The thus obtained polymer was repeatedly purified by use of methanol, toluene and silicone oil, whereby Resin No. 2 for use in an ink composition of the present invention was obtained.

The thus obtained Resin No. 2 is particularly useful for obtaining an ink composition with excellent insulating properties and ink ejection performance.

REFERENCE EXAMPLE 3

[Preparation of Resin No. 3]

A mixture with the following components was placed in a three-necked flask and polymerized at 80° C. for 10 hours, whereby a reaction product was obtained:

[Formulation]

| | |
|---|---|
| Isopropyl myristate (polymerization solvent) | 200 g |
| Vinyltoluene | 10 g |
| Vinylpyrrolidone | 10 g |
| Acryl methacrylate | 10 g |
| Azobisisobutyronitrile | 3 g |

To this reaction product 20 g of isobutyl methacrylate, 10 g of acrylic acid and 1 g of benzoyl peroxide were added. This reaction mixture was then stirred at 90° C. for 6 hours, whereby a resin dispersion liquid with a viscosity of 18 cPs was obtained with a conversion of 89%.

The thus obtained resin dispersion liquid was purified by use of methanol and isopropyl myristate, whereby Resin No. 3 for use in an ink composition of the present invention was obtained.

The thus obtained Resin No. 3 is particularly useful for obtaining an ink composition with excellent charging performance.

In the course of the preparation of Resin No. 3, a coloring agent may be mixed with the above-mentioned monomers or the polymerization solvent to prepare a polymerized pigment, whereby an ink composition of the present invention can be obtained. In this case, it is necessary to purify the polymerized pigment with alcohol or the like in order to prevent the specific resistance of the ink composition containing this polymerized pigment from lowering under the application of voltage thereto.

EXAMPLE 1

A mixture of the following components was dispersed in an attritor for 4 hours, whereby an ink composition No. 1 of the present invention was prepared:

| | Parts by Weight |
|---|---|
| Carbon black (Trademark "Mitsubishi #44) purified by methanol and toluene | 10 |
| Humic acid/polyvinylpyrrolidone/ methacrylic acid copolymer (50/45/5 weight ratio) | 20 |
| Lauryl alcohol | 300 |

Measurement of Average Particle Size of Charged Particles

The average particle size of the charged particles in the ink composition No. 1 of the present invention was measured to be 0.31 μm by a commercially available particle size distribution meter (Trademark "SACP-3" made by Shimadzu Corporation).

Measurement of Specific Resistance of Ink Composition 20 ml of the ink composition No. 1 was placed in an electrodeposition cell with a capacity of 20 ml comprising a pair of electrodes made of brass with a size of 40 mm×50 mm. The electric current (I) through the ink composition under the application of DC 1000 volt (E) across the electrodes for 50 seconds was measured, and the specific resistance (R) of the ink composition No. 1 was obtained in accordance with the following formula:

$$R=E/I$$

The specific resistance of the ink composition No. 1 was $1.6 \times 10^{11} \Omega cm$.

Measurement of Specific Charge Quantity of Charged Particles 20 ml of the ink composition No. 1 was placed in an electrodeposition cell with a capacity of 20 ml comprising a pair of electrodes made of brass with a size of 40 mm×50 mm. A DC 1000 volt was applied across the electrodes for 50 seconds. The weight of the charged particles deposited on the electrode and the integrated charge quantity were measured, so that the specific resistance of the charged particles was determined by the following formula:

Specific charge quantity ($\mu C/g$)=Integrated charge quantity ($\mu C$)/ Weight of Deposited charged particles (g)

The specific charge quantity of the charged particles of the ink composition No. 1 of the present invention was 30 $\mu C/g$.

Measurement of Melt Viscosity of Ink Composition

A predetermined amount of the ink composition No. 1 was filtered to remove the carrier medium therefrom and the residue was dried until the carrier medium was completely removed therefrom. The melt viscosity (pa·sec) of the thus obtained dried residue was measured at 120° C. by Dynamic Spectrometer made by Rheometrics Inc.

The thus measured melt viscosity (pa·sec) of the ink composition No. 1 was 70 pa·sec.

[Ink-Jet Ejection Tests A, B, C and D]

The content of the solid components in the ink composition No. 1 before the following ink-jet ejection tests was 9.1 wt. %.

Ink-Jet Ejection Test A

The ink composition No. 1 was subjected to an ink-jet ejection test A by use of an ink-jet ejection test machine A as shown in FIG. 1.

As shown in FIG. 1, in the ink-jet ejection test A, the ink composition No. 1 was placed in a syringe 2, and a high voltage was applied thereto by a high voltage power source (DC) 6 to eject the ink composition No. 1 from the syringe 2 onto to an electrode or printing substrate 1 at a distance of 10 mm from the tip of the syringe 2, whereby the voltage necessary for this ejection was measured.

The result was that the necessary voltage for the ejection of the ink composition No. 1 onto the electrode or printing substrate 1 was 310 volt.

The content of the solid components in the ink composition ejected in this ink-jet ejection test A was 26.5 wt. %.

The diameter of each printed dot obtained in this test was about 76 μm, and the image density thereof was 1.28.

Furthermore, the period of time required for the ejected ink composition No. 1 to be fixed on a sheet of paper was also measured. This image fixing performance is referred to as the first image fixing performance.

The first image fixing performance of the ink composition No. 1 was 682 seconds.

In addition, the images thus fixed on the paper was erased by reciprocating a rubber eraser in contact with the images five times by use of an erasing device with a clock-meter system, and the ratio of the image density of the erased images to the image density of the unerased images was obtained by percentage in accordance with the following formula:

[(Image density of fixed images erased by 5 times reciprocation of a rubber eraser in contact therewith)/(Image density of initial fixed images)]×100%

This image fixing performance is referred to as the second image fixing performance. The second image fixing performance of the ink composition No. 1 was 62%.

Ink-Jet Election Test B

Figure 2:
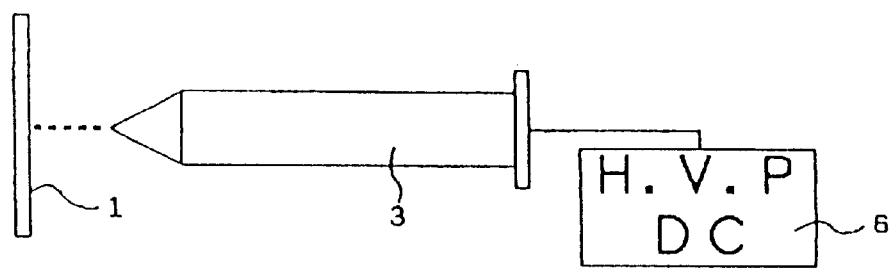
FIG. 2 is a schematic illustration of an ink-jet ejection test machine B.

The ink composition No. 1 was subjected to an ink-jet ejection test B by use of an ink-jet ejection test machine B as shown in FIG. 2.

As shown in FIG. 2, in the ink-jet ejection test B, the ink composition No. 1 was applied to the surface of a tip of a nail 3, and a high voltage was applied thereto by a high voltage power source (DC) 6 to eject the ink composition No. 1 from the surface of the tip of the nail 3 onto the electrode or printing substrate 1 at a distance of 10 mm from the tip of the nail 3, whereby the voltage necessary for this ejection was measured.

The result was that the necessary voltage for the ejection of the ink composition No. 1 onto the electrode or printing substrate 1 was 460 volt.

The content of the solid components in the ink composition ejected in this ink-jet ejection test B was 30.3 wt. %.

Ink-Jet Ejection Test C

Figure 3:
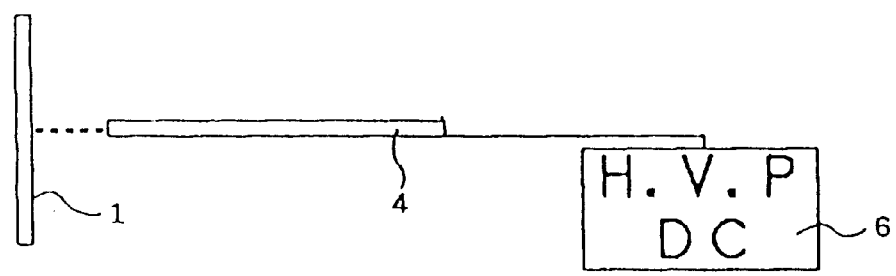
FIG. 3 is a schematic illustration of an ink-jet ejection test machine C.

The ink composition No. 1 was subjected to an ink-jet ejection test C by use of an ink-jet ejection test machine C as shown in FIG. 3.

As shown in FIG. 3, in the ink-jet ejection test C, the ink composition No. 1 was applied to the surface of a side of a flat copper electrode 4, and a high voltage was applied thereto by a high voltage power source (DC) 6 to eject the ink composition No. 1 from the side of the flat copper electrode 4 onto to the electrode or printing substrate 1 at a distance of 10 am from the side of the flat copper electrode 4, whereby the voltage necessary for this ejection was measured.

The result was that the necessary voltage for the ejection of the ink composition No. 1 onto the electrode or printing substrate 1 was 510 volt.

The content of the solid components in the ink composition ejected by this ink-let ejection test C was 25.5 wt. %.

Comparative Example 1

For comparison, a commercially available ink (Trademark "INK CARTRIDGE HG ICI" made by Epson) was subjected to the same ink-jet ejection tests A, B and C as in Example 1. However, no ink was ejected in any of the ink-jet ejection tests A, B and C even by the application of 5,000 volts thereto.

The specific resistance of this ink was less than $10^8$ Ωcm, and the specific charge quantity of the charged particles in the ink was 0 μC/g.

It was impossible to measure the other properties of this ink because the ink was not ejected in any of the above-mentioned tests.

EXAMPLE 2

A mixture of the following components was dispersed in an attritor for 3 hours, whereby an ink composition No. 2 of the present invention was prepared:

|  | Parts by Weight |
|---|---|
| Pigment No. 25 (made by Morimura Badische Co., Ltd.) | 10 |
| Lauryl methacrylate/glycidyl methacrylate/vinylpyridine (80/15/5 molar ratio) copolymer | 5 |
| Salt of humic acid | 5 |
| Isopar H | 300 |

The average particle size of the charged particles in the ink composition No. 2, which was measured in the same manner as in Example 1, was about 0.1 μm.

The specific resistance of the ink composition No. 2, which was measured in the same manner as in Example 1, was $1.5 \times 10^{12}$ Ωcm.

The specific charge quantity of the charged particles of the ink composition No. 2, which was measured in the same manner as in Example 1, was 155 μC/g.

The melt viscosity (pa·sec) of the ink composition No. 2 at 120° C., which was measured in the same manner as in Example 1, was 16.5 pa·sec.

The content of the solid components in the ink composition No. 2 before the following ink-jet ejection tests A, B and C was 6.2 wt. %.

Ink-Jet Ejection Test A

The ink composition No. 2 was subjected to the same ink-jet ejection test A as in Example 1.

The result was that the necessary voltage for the ejection of the ink composition No. 2 onto the electrode or printing substrate 1 was 260 volt.

The content of the solid components in the ink composition ejected in this ink-jet ejection test A was 25.4 wt. %.

The diameter of each printed dot obtained in this test was about 50 μm, and the image density thereof was 1.40.

The first image fixing performance of the ink composition No. 2 was 48 seconds.

The second image fixing performance of the ink composition No. 2 was 71%.

Ink-Jet Ejection Test B

The ink composition No. 2 was subjected to the same ink-jet ejection test B as in Example 1.

The necessary voltage for the ejection of the ink composition No. 2 onto the electrode or printing substrate 1 was 240 volt.

The content of the solid components in the ink composition No. 2 ejected in this ink-jet ejection test B was 29.1 wt. %.

Ink-Jet Ejection Test C

The ink composition No. 2 was subjected to the same ink-jet ejection test C as in Example 1.

The necessary voltage for the ejection of the ink composition No. 2 onto the electrode or printing substrate 1 was 460 volt.

The content of the solid components in the ink composition No. 2 ejected in this ink-jet ejection test C was 30.5 wt. %.

Comparative Example 2

A commercially available ink (Trademark "IBM INK CARTRIDGE") was subjected to the same ink-jet ejection tests A, B and C as in Example 1.

However, no ink was ejected in any of the ink-jet ejection tests A, B and C even by the application of 5,000 volts.

The specific resistance of this ink was less than $10^8$ Ωcm, and the specific charge quantity of the charged particles in the ink was 0 μC/g.

It was impossible to measure the other properties of this ink because the ink was not ejected in any of the above tests.

EXAMPLE 3

A mixture of the following components was dispersed in a paint shaker for 6 hours, whereby an ink composition No. 3 of the present invention was prepared:

|  | Parts by Weight |
|---|---|
| Flushed Pigment No. 5 (made by Morimura Badische Co., Ltd.) | 10 |
| Silicone oil (Trademark "KF96L-1.5") | 300 |

The average particle size of the charged particles in the ink composition No. 3 was about 0.3 μm.

The specific resistance of the ink composition No. 3 was $1.6 \times 10^{14}$ Ωcm.

The specific charge quantity of the charged particles of the ink composition No. 3 was 320 μC/g.

The melt viscosity (pa·sec) of the ink composition No. 3 at 120° C. was 160 pa·sec.

The content of the solid components in the ink composition No. 3 before the following ink-jet ejection tests A, B and C was 3.2 wt. %.

Ink-Jet Ejection Test A

The ink composition No. 3 was subjected to the same ink-jet ejection test A as in Example 1.

The result was that the necessary voltage for the ejection of the ink composition No. 3 onto the electrode or printing substrate 1 was 210 volts.

The content of the solid components in the ink composition elected in this ink-let ejection test A was 29.4 wt. %.

The diameter of each printed dot obtained in this test was about 42 μm, and the image density thereof was 1.40.

The first image fixing performance of the ink composition No. 3 was 30 seconds.

The second image fixing performance of the ink composition No. 3 was 70%.

Ink-Jet Election Test B

The ink composition No. 3 was subjected to the same ink-jet ejection test B as in Example 1.

The necessary voltage for the ejection of the ink composition No. 3 onto the electrode or printing substrate 1 was 245 volts.

The content of the solid components in the ink composition No. 3 ejected by this ink-jet ejection test B was 32.6 wt. %.

Ink-Jet Ejection Test C

The ink composition No. 3 was subjected to the same ink-jet ejection test C as in Example 1.

The necessary voltage for the ejection of the ink composition No. 3 onto the electrode or printing substrate 1 was 105 volts.

The content of the solid components in the ink composition No. 3 ejected by this ink-jet ejection test C was 28.2 wt. %.

Ink-Jet Ejection Test D

Figure 4:
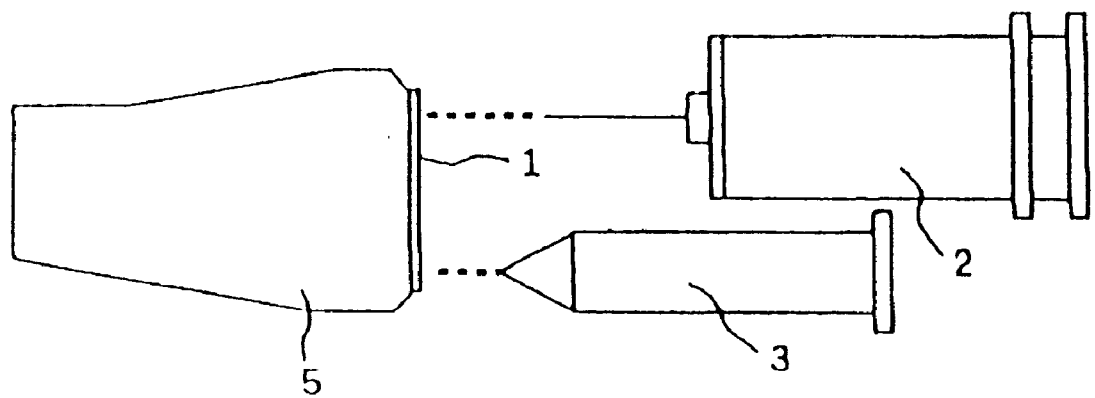
FIG. 4 is a schematic illustration of an ink-jet ejection test machine D.

The ink composition No. 3 was subjected to an ink-jet ejection test D by use of an ink-jet ejection test machine C as shown in FIG. 4.

As shown in FIG. 4, in the ink-jet ejection test D, the ink composition No. 3 was placed in the syringe 2 or applied to the surface of the tip of the nail 3, and a printing substrate 1 was placed on the surface of a display 5, which was a commercially available display device ("NEC 9801"), to utilize the electrostatic force generated thereon.

With the application of a voltage to the ink composition No. 3 for the ejection thereof, the ink composition No. 3 was ejected either from the tip of the nail 3 or from the syringe 2.

The ink composition No. 3 was ejected from the syringe 2 onto the electrode or printing substrate 1 at a distance of 100 mm therefrom and was also ejected onto the printing substrate 1 from the tip of the nail 3 at a distance of 80 mm therefrom.

EXAMPLE 4

A mixture of the following components was dispersed in an attritor for 3 hours, whereby an ink composition No. 4 of the present invention was prepared:

|  | Parts by Weight |
|---|---|
| Flushed Pigment No. 1 (made by Morimura Badische Co., Ltd.) purified with methanol | 10 |
| Resin No. 2 prepared in Reference Example 2 (carefully purified with methanol and toluene) | 20 |
| Silicone oil (Trademark "KF995") | 300 |

The average particle size of the charged particles in the ink composition No. 4 was about 0.1 μm.

The specific charge quantity of the charged particles of the ink composition No. 4 was 660 μC/g.

The specific resistance of the ink composition No. 4 was 3.8×10$^{13}$Ωcm.

The melt viscosity (pa·sec) of the ink composition No. 4 at 120° C. was 460 pa·sec.

Ink-Jet Election Test A

The ink composition No. 4 was subjected to the same ink-jet ejection test A as in Example 1.

The result was that the necessary voltage for the ejection of the ink composition No. 4 onto the electrode or printing substrate 1 was 280 volts.

The diameter of each printed dot obtained in this test was about 40 μm, and the image density thereof was 1.38.

The first image fixing performance of the ink composition No. 4 was 40 seconds.

The second image fixing performance of the ink composition No. 4 was 76%.

Ink-Jet Ejection Test B

The ink composition No. 4 was subjected to the same ink-jet ejection test B as in Example 1.

The necessary voltage for the ejection of the ink composition No. 4 onto the electrode or printing substrate 1 was 300 volts.

Ink-Jet Ejection Test C

The ink composition No. 4 was subjected to the same ink-jet ejection test C as in Example 1.

The necessary voltage for the ejection of the ink composition No. 4 onto the electrode or printing substrate 1 was 300 volts.

Ink-Jet Ejection Test D

The ink composition No. 4 was subjected to the same ink-jet ejection test D as in Example 3.

The-result was that the ink composition No. 4 was ejected from the syringe 2 onto the electrode or printing substrate 1 at a distance of 130 mm therefrom, and was ejected onto the printing substrate 1 from the tip of the nail 3 with a distance of 95 mm therefrom.

Ink-Jet Ejection Test E

Figure 5:
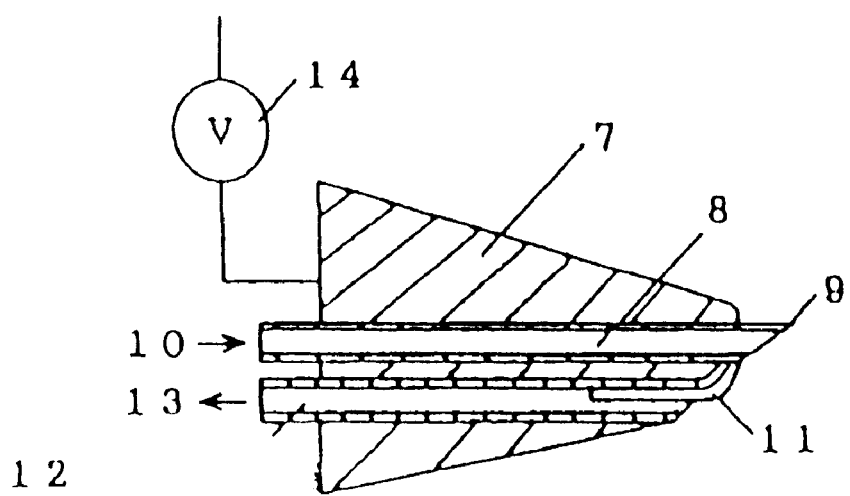
FIG. 5 is a schematic illustration of an ink-jet ejection test machine E.

The ink composition No. 4 was subjected to an ink-jet ejection test E by use of a test machine as shown in FIG. 5.

In FIG. 5, reference numeral 7 indicates an electroconductive member; reference numeral 8, an ink supply tube; reference numeral 9, an ink ejection outlet with a diameter of 25 μm; reference numeral 10, an ink supply direction from an ink supply system (not shown); reference numeral 11, an ink flow path for recovery of the ink; reference numeral 12, an ink recovery path; and reference numeral 13, an ink recovery direction to an ink recovery system.

The result of the ink-jet ejection test E was that the ink composition No. 4 was ejected from the ink ejection outlet 9 with the application of 150 volts thereto.

A comparative ink composition prepared by dispersing an organic pigment in an isoparaffin-based liquid having an initial running point at 159° C. was ejected from the ink ejection outlet 9 so as to cause the ejected ink to impinge on the substrate 1 with a distance of 90 mm therefrom in the same ink-jet ejection test E as mentioned above. The result was that the application of 1000 volts was required to perform the above ejection.

In comparison with this, the required voltage for the ejection of the ink composition No. 4 was much lower.

EXAMPLE 5

A mixture of the following components was dispersed in an attritor for 3 hours, whereby an ink composition No. 5 of the present invention was prepared:

|  | Parts by Weight |
| --- | --- |
| Polymerized toner (spherical particles with a diameter of 0.3 μm) | 20 |
| Silicone oil (Trademark "KF994") | 300 |

The average particle size of the charged particles in the ink composition No. 5 was about 0.3 μm.

The specific resistance of the ink composition No. 5 was 3.5×10$^{12}$Ωcm.

The specific charge quantity of the charged particles of the ink conmposition No. 5 was 180 μC/g.

The melt viscosity. (pa·sec) of the ink composition No. 5 at 120°C. was 6,300 pa·sec.

This ink composition was of a negative polarity.

Ink-Jet Election Test A

The ink composition No. 5 was subjected to the same ink-jet ejection test A as in Example 3.

The result was that the necessary voltage for the ejection of the ink composition No. 5 onto the electrode or printing substrate 1 was 200 volts.

The diameter of each printed dot obtained in this test was about 30 μm, and the image density thereof was 1.46.

The first image fixing performance of the ink composition No. 5 was 18 seconds.

The second image fixing performance of the ink composition No. 5 was 76%.

Ink-Jet Ejection Test B

The ink composition No. 5 was subjected to the same ink-jet ejection test B as in Example 3.

The necessary voltage for the ejection of the ink composition No. 5 onto the electrode or printing substrate 1 was 210 volts.

Ink-Jet Ejection Test C

The ink composition No. 5 was subjected to the same ink-jet ejection test C as in Example 3.

The necessary voltage for the ejection of the ink composition No. 5 onto the electrode or printing substrate 1 was 300 volts.

Ink-Jet Ejection Test D

The ink composition No. 5 was subjected to the same ink-jet ejection test D as in Example 3.

The result was that the ink composition No. 5 was ejected from the syringe 2 onto the electrode or printing substrate 1 with a distance of 160 mm therefrom and also was ejected onto the printing substrate 1 from the tip of the nail 3 with a distance of 135 mm therefrom.

It was possible to fix the ink composition No. 5 by use of heat rollers.

It was also possible to eject the ink composition No. 5 with the application of negative voltages. In this case, the necessary voltages for the ejection of this ink composition onto the electrode or printing substrate 1 in the ink-jet ejection tests A, B and C were respectively −210 volts, −120 volts and −180 volts.

EXAMPLE 6

A mixture of the following components was dispersed at 50° C. for 1 hour and then rapidly cooled, whereby an ink composition No. 6 of the present invention was prepared:

| | Parts by Weight |
|---|---|
| Carbon black (Trademark "#44" made by Mitsubishi Kasei Corporation) | 20 |
| Ethylene/vinyl acetate copolymer (85/15 weight ratio) | 10 |
| Silicone oil (Trademark "KF96L-1.0") | 300 |

The average particle size of the charged particles in the ink composition No. 6 was about 1.8 μm.

The specific charge quantity of the charged particles of the ink composition No. 6 was 40 μC/g.

The specific resistance of the ink composition No. 6 was $4.4 \times 10^{14}$ Ωcm.

The melt viscosity (pa·sec) of the ink composition No. 6 at 120° C. was 800 pa·sec.

The shape of the charged particles in the ink composition, inspected by a transmission electron microscope (Trademark "H-500H" made by Hitachi, Ltd.), was fibrous.

Ink-Jet Ejection Test A

The ink composition No. 6 was subjected to the same ink-jet ejection test A as in Example 1.

The result was that the necessary voltage for the ejection of the ink composition No. 6 onto the electrode or printing substrate 1 was 260 volts.

The diameter of each printed dot obtained in this test was about 24 μm, and the image density thereof was 1.51.

The first image fixing performance of the ink composition No. 6 was 5.8 seconds.

The second image fixing performance of the ink composition No. 6 was 89%.

Ink-Jet Ejection Test B

The ink composition No. 6 was subjected to the same ink-jet ejection test B as in Example 1.

The necessary voltage for the ejection of the ink composition No. 6 onto the electrode or printing substrate 1 was 260 volts.

Ink-Jet Ejection Test C

The ink composition No. 6 was subjected to the same ink-jet ejection test C as in Example 1.

The necessary voltage for the ejection of the ink composition No. 6 onto the electrode or printing substrate 1 was 360 volts.

It is considered that the above excellent results were obtained by the fibrous shape of the charged particles in the ink composition No. 6. When the charged particles are fibrous in shape, the charged particles aggregate and can be ejected slowly when the ejection voltage is applied thereto.

The ink composition No. 6 was used in a commercially available printer for a bubble jet system made by Canon Inc. The result was that images with high density were printed with excellent image fixing performance.

EXAMPLE 7

A mixture of the following components was dispersed in an attritor for 3 hours, whereby an ink composition No. 7 of the present invention was prepared:

| | Parts by Weight |
|---|---|
| Pigment No. 25 (made by Morimura Badische Co., Ltd.) | 10 |
| Lauryl methacrylate/glycidyl methacrylate/vinylpyridine (80/15/5 molar ratio) copolymer | 20 |
| Salt of humic acid | 15 |
| Isopar H | 300 |

The average particle size of the charged particles in the ink composition No. 7 was about 0.04 μm.

The specific charge quantity of the charged particles of the ink composition No. 7 was 980 μC/g.

The specific resistance of the ink composition No. 7 was $6.4 \times 10^{13}$ Ωcm.

The melt viscosity (pa·sec) of the ink composition No. 7 at 120° C. was 2,800 pa·sec.

The content of the solid components in the ink composition No. 7 before the following ink-jet ejection tests A, B and C was 13.0 wt. %.

Ink-Jet Ejection Test A

The ink composition No. 7 was subjected to the same ink-jet ejection test A as in Example 1.

The result was that the necessary voltage for the ejection of the ink composition No. 7 onto the electrode or printing substrate 1 was 280 volts.

The content of the solid components in the ink composition ejected in this ink-jet ejection test A was 18.0 wt. %.

The diameter of each printed dot obtained in this test was about 48 μm, and the image density thereof was 1.36.

The first image fixing performance of the ink composition No. 7 was 62 seconds.

The second image fixing performance of the ink composition No. 7 was 74%.

Ink-Jet Ejection Test B

The ink composition No. 7 was subjected to the same ink-jet ejection test B as in Example 1.

The necessary voltage for the ejection of the ink composition No. 7 onto the electrode or printing substrate 1 was 300 volts.

The content of the solid components in the ink composition ejected in this ink-jet ejection test B was 22.5 wt. %.

Ink-Jet Ejection Test C

The ink composition No. 7 was subjected to the same ink-jet ejection test C as in Example 1.

The necessary voltage for the ejection of the ink composition No. 7 onto the electrode or printing substrate 1 was 305 volts.

The content of the solid components in the ink composition ejected in this ink-jet ejection test C was 23.8 wt. %.

EXAMPLE 8

A mixture of the following components was dispersed in an attritor for 3 hours, whereby an ink composition No. 8 of the present invention was prepared:

| | Parts by Weight |
|---|---|
| Pigment No. 25 (made by Morimura Badische Co., Ltd.) | 10 |
| Lauryl methacrylate/glycidyl | 1 |

-continued

| | Parts by Weight |
|---|---|
| methacrylate/vinylpyridine (80/15/5 molar ratio) copolymer | |
| Salt of humic acid | 0.1 |
| Isopar H | 300 |

The average particle size of the charged particles in the ink composition No. 8 was about 0.9 μm.

The specific charge quantity of the charged particles of the ink composition No. 8 was 12 μC/g.

The specific resistance of the ink composition No. 8 was $2.5 \times 10^{14}$ Ωcm.

The melt viscosity (pa·sec) of the ink composition No. 8 at 120° C. was 10.8 pa·sec.

The content of the solid components in the ink composition No. 8 before the following ink-jet ejection tests A, B and C was 3.5 wt. %.

Ink-Jet Ejection Test A

The ink composition No. 8 was subjected to the same ink-jet ejection test A as in Example 1.

The result was that the necessary voltage for the ejection of the ink composition No. 8 onto the electrode or printing substrate 1 was 460 volts.

The content of the solid components in the ink composition ejected in this ink-jet ejection test A was 18.9 wt. %.

The diameter of each printed dot obtained in this test was about 86 μm, and the image density thereof was 1.21.

The first image fixing performance of the ink composition No. 8 was 69 seconds.

The second image fixing performance of the ink composition No. 8 was 60%.

Ink-Jet Ejection Test B

The ink composition No. 8 was subjected to the same ink-jet ejection test B as in Example 1.

The necessary voltage for the ejection of the ink composition No. 8 onto the electrode or printing substrate 1 was 495 volts.

The content of the solid components in the ink composition ejected in this ink-jet ejection test B was 25.1 wt. %.

Ink-Jet Ejection Test C

The ink composition No. 8 was subjected to the same ink-jet ejection test C as in Example 1.

The necessary voltage for the ejection of the ink composition No. 8 onto the electrode or printing substrate 1 was 600 volts.

The content of the solid components in the ink composition ejected in this ink-jet ejection test C was 24.8 wt. %.

EXAMPLE 9

A mixture of the following components was dispersed at 50° C. for 1 hour and then rapidly cooled, whereby an ink composition No. 9 of the present invention was prepared:

| | Parts by Weight |
|---|---|
| Carbon black (Trademark "#44" made by Mitsubishi Kasei Corporation), purified with toluene and ethanol | 20 |
| Ethylene/vinyl acetate copolymer (85/15 weight ratio) | 10 |
| Silicone Oil (Trademark "KF96L-1.0") | 300 |

The average particle size of the charged particles in the ink composition No. 9 was about 2.5 μm.

The specific charge quantity of the charged particles of the ink composition No. 9 was 580 μC/g.

The specific resistance of the ink composition No. 9 was $1.5 \times 10^{16}$ Ωcm.

The melt viscosity (pa·sec) of the ink composition No. 9 at 120° C. was 980 pa·sec.

The content of the solid components in the ink composition No. 9 before the following ink-jet ejection tests A, B and C was 9.0 wt. %.

Ink-Jet Ejection Test A

The ink composition No. 9 was subjected to the same ink-jet ejection test A as in Example 1.

The result was that the necessary voltage for the ejection of the ink composition No. 9 onto the electrode or printing substrate 1 was 245 volts.

The content of the solid components in the ink composition ejected in this ink-jet ejection test A was 29.8 wt. %.

The diameter of each printed dot obtained in this test was about 22 μm, and the image density thereof was 1.53.

The first image fixing performance of the ink composition No. 9 was 5.6 seconds.

The second image fixing performance of the ink composition No. 9 was 89%.

Ink-Jet Ejection Test B

The ink composition No. 9 was subjected to the same ink-jet ejection test B as in Example 1.

The necessary voltage for the ejection of the ink composition No. 9 onto the electrode or printing substrate 1 was 250 volts.

The content of the solid components in the ink composition ejected in this ink-jet ejection test B was 38.2 wt. %.

Ink-Jet Ejection Test C

The ink composition No. 9 was subjected to the same ink-jet ejection test C as in Example 1.

The necessary voltage for the ejection of the ink composition No. 9 onto the electrode or printing substrate 1 was 340 volts.

The content of the solid components in the ink composition ejected in this ink-jet ejection test C was 36.5 wt. %.

EXAMPLE 10

A mixture of the following components was dispersed in an attritor for 4 hours, whereby an ink composition No. 10 of the present invention was prepared:

| | Parts by Weight |
|---|---|
| Carbon black (Trademark "Mitsubishi #44) purified by methanol and toluene | 10 |
| Humic acid/polyvinylpyrrolidone/ methacrylic acid copolymer (50/45/5 weight ratio) | 20 |
| Lauryl alcohol | 300 |
| Manganese naphthenate | 0.02 |

The average particle size of the charged particles in the ink composition No. 10 was about 0.8 μm.

The specific charge quantity of the charged particles of the ink composition No. 10 was 48 μC/g.

The specific resistance of the ink composition No. 10 was $1.5 \times 10^{10}$ Ωcm.

The melt viscosity (pa·sec) of the ink composition No. 10 at 120° C. was 65 pa·sec.

The content of the solid components in the ink composition No. 10 before the following ink-jet ejection tests A, B and C was 9.1 wt. %.

Ink-Jet Ejection Test A

The necessary voltage for the ejection of the ink composition No. 10 onto the electrode or printing substrate 1 was 620 volts.

The content of the solid components in the ink composition ejected in this ink-jet ejection test C was 23.1 wt. %.

The results obtained in Examples 1–10 and Comparative Examples 1–2 are summarized in the following TABLE 2:

TABLE 2

| | Specific Resistance (Ωcm) | Specific Charge Quantity (μC/g) | Average Particle Size (μm) | Melt Viscosity (pa·sec) | Applied Voltage for Ejection of Ink Composition (V) | | | Solid Components (%) | | | | First Image Fixing Perfor-mance (sec) | Second Image Fixing Perfor-mance (%) | Im-age Den-sity | Dia-meter (μm) of Printed Dot |
|---|---|---|---|---|---|---|---|---|---|---|---|---|---|---|---|
| | | | | | Test A | Test B | Test C | Before Ejection | After Ejection | | | | | | |
| | | | | | | | | | Test A | Test B | Test C | | | | |
| Ex. 1 | $1.6 \times 10^{11}$ | 30 | 0.31 | 70 | 310 | 460 | 510 | 9.1 | 26.5 | 30.3 | 25.5 | 682 | 62 | 1.28 | 76 |
| Comp. Ex. 1 | less than $10^8$ | 0 | — | — | This ink composition was not ejected at 5000 V. | | | Measurements of these properties were impossible because the ejection of this ink was impossible. | | | | | | | |
| Ex. 2 | $1.5 \times 10^{12}$ | 155 | 0.1 | 16.5 | 260 | 240 | 460 | 6.2 | 25.4 | 29.1 | 30.5 | 48 | 71 | 1.40 | 50 |
| Comp. Ex. 2 | less than $10^8$ | 0 | — | — | This ink composition was not ejected at 5000 V. | | | Measurements of these properties were impossible because the ejection of this ink was impossible. | | | | | | | |
| Ex. 3 | $1.6 \times 10^{14}$ | 320 | 0.3 | 160 | 210 | 245 | 105 | 3.2 | 29.4 | 32.6 | 28.2 | 30 | 70 | 1.40 | 42 |
| Ex. 4 | $3.8 \times 10^{13}$ | 660 | 0.1 | 460 | 280 | 300 | 300 | Test D: The ejection of the ink was possible from the syringe 2 at a distance of 130 mm from the printing substrate 1, and also from the nail 3 at a distance of 95 mm from the printing substrate 1. | | | | 40 | 75 | 1.38 | 40 |
| Ex. 5 | $3.5 \times 10^{12}$ | 180 | 0.3 | 6,300 | 200 | 210 | 300 | ← when ejected in the same manner as in Example 3. | | | | 18 | 76 | 1.46 | 30 |
| | | | | | −210 | −120 | −180 | ← when a negative voltage was applied. | | | | | | | |
| Ex. 6 | $4.4 \times 10^{14}$ | 40 | 1.8 | 800 | 260 | 260 | 360 | The shape of the charged particles was fibrous. | | | | 5.8 | 89 | 1.51 | 24 |
| Ex. 7 | $6.4 \times 10^{13}$ | 980 | 0.04 | 2,800 | 280 | 300 | 305 | 13.0 | 18.0 | 22.5 | 23.8 | 62 | 74 | 1.36 | 48 |
| Ex. 8 | $2.5 \times 10^{14}$ | 12 | 0.9 | 10.8 | 460 | 495 | 600 | 3.5 | 18.9 | 25.1 | 24.8 | 69 | 60 | 1.21 | 86 |
| Ex. 9 | $1.5 \times 10^{16}$ | 580 | 2.5 | 980 | 245 | 250 | 340 | 9.0 | 29.8 | 38.2 | 36.5 | 5.6 | 89 | 1.53 | 22 |
| Ex. 10 | $1.5 \times 10^{10}$ | 48 | 0.8 | 65 | 460 | 500 | 620 | 9.1 | 20.6 | 24.1 | 23.1 | 785 | 60 | 1.21 | 83 |

The ink composition No. 10 was subjected to the same ink-jet ejection test A as in Example 1.

The result was that the necessary voltage for the ejection of the ink composition No. 10 onto the electrode or printing substrate 1 was 460 volts.

The content of the solid components in the ink composition ejected in this ink-jet ejection test A was 20.6 wt. %.

The diameter of each printed dot obtained in this test was about 83 μm, and the image density thereof was 1.21.

The first image fixing performance of the ink composition No. 10 was 785 seconds.

The second image fixing performance of the ink composition No. 10 was 60%.

Ink-Jet Ejection Test B

The ink composition No. 10 was subjected to the same ink-jet ejection test B as in Example 1.

The necessary voltage for the ejection of the ink composition No. 10 onto the electrode or printing substrate 1 was 500 volts.

The content of the solid components in the ink composition ejected in this ink-jet ejection test B was 24.1 wt. %.

Ink-Jet Ejection Test C

The ink composition No. 10 was subjected to the same ink-jet ejection test C as in Example 1.

The ink compositions of the present invention can be employed not only for the above-mentioned ink-jet printing, but also as liquid developers for use in electrophotography.

The following are additional examples of such an ink composition that can be employed in electrophotography:

EXAMPLE 11

A mixture of the following components was placed in a flask and stirred at 90° C. for 12 hours, whereby a cyan-color dispersion liquid (1) containing cyan-color resin particles was prepared:

| | Parts by Weight |
|---|---|
| Isopar H | 100 |
| Phthalocyanine Blue | 15 |
| Methacryl-modified silicone compound (Trademark "X-22-5002" made by Shin-Etsu Chemical Co., Ltd.) | 30 |

-continued

| | Parts by Weight |
|---|---|
| 2, 4-tolylenediisocyanate | 5 |
| Benzoyl peroxide | 3 |
| Acrylic acid | 2 |

50 g of the thus obtained cyan-color dispersion liquid (1) was dispersed in 1000 ml of Isopar H, whereby a liquid developer A for use in electrophotography was prepared.

By use of this liquid developer A, image formation was conducted on plain paper by use of a commercially available electrophotographic copying machine (Trademark "CT-5085" made by Ricoh Company, Ltd.).

As a result, high quality copy images with an image density of 1.29, a resolution of 6.3 lines/mm and a gradation of 7.0 were obtained.

The image fixing ratio of the thus obtained images was 68%.

The image fixing ratio was measured in accordance with the following formula:

Image Fixing Ratio=[(Image density after friction of the image by a clock meter 10 times/Image density before the friction)]×100%

Liquids developers prepared by diluting the cyan-color dispersion liquid (1) were excellent in both image fixing performance and dispersibility.

EXAMPLE 12

The procedure of the preparation of the cyan dispersion liquid (1) prepared in Example 11 was repeated except that the methacryl-modified silicone compound employed in the cyan-color dispersion liquid (1) in Example 11 was replaced by a reactive silicone compound of the following formula, whereby a cyan-color dispersion liquid (2) was prepared:

$$HO-\underset{\underset{CH_3}{|}}{\overset{\overset{CH_3}{|}}{Si}}-O-\left(\underset{\underset{CH_3}{|}}{\overset{\overset{CH_3}{|}}{Si}}-O\right)_{15}\underset{\underset{CH_3}{|}}{\overset{\overset{CH_3}{|}}{Si}}-OH$$

50 g of the thus obtained cyan-color dispersion liquid (2) was dispersed in 1000 ml of Isopar H, whereby a liquid developer B for use in electrophotography was prepared.

By use of this liquid developer B, image formation was conducted in the same manner as in Example 11 by use of the same electrophotographic copying machine as used in Example 11.

As a result, high quality copy images with an image density of 1.44, a resolution of 7.2 lines/mm and a gradation of 7.0 were obtained.

The image fixing ratio of the thus obtained images was as high as 81%.

The cyan-color dispersion liquid (2) is a coloring agent capable of providing water and oil repellent copy images, and images formed by this coloring agent can be thermally fixed.

Furthermore, the cyan-color dispersion liquid (2) can also be employed for use in inks for ink-jet recording systems such as a slit-jet recording system using pin electrodes, a piezo-jet recording system and a bubble-jet recording system. Such inks have excellent ink ejection performance and can provide high quality images.

EXAMPLE 13

300 g of Isopar H (made by Exxon Chemical Co., Ltd.) was placed in a flask and heated to 90° C.

To this heated Isopar H, 50 g of Kayaset Yellow A-G and 100 g of a silicone oligomer (Trademark "X-22-176B" made by Shin-Etsu Chemical Co., Ltd.) were added. This reaction mixture was stirred at 90° C. for 6 hours.

To this reaction mixture, 50 g of methyl methacrylate, 3 g of glycidyl methacrylate, 30 g of isophorone diisocyanate and 0.5 g of benzoyl peroxide were added, and the mixture was dispersed at 90° C. for 3 hours, whereby a liquid developer for use in electrophotography was prepared.

It is considered that pigment-including polymer toner particles were formed in this liquid developer because the above-mentioned silicone oligomer has hydroxyl groups and therefore reacts with the isophorone diisocyanate to form urethane bonds.

A transparent for overhead projector (OHP) was prepared by use of this liquid developer and a commercially available copying machine (Trademark "Ricopy 400i" made by Ricoh Company, Ltd.), with image fixing by hot air application at 100° C.

The OHP color reproduction was excellent and the image fixing ratio was 80%.

The liquid developer prepared in this example is practically usable as an ink for ink-jet recording.

EXAMPLE 14

500 g of an ethylene-maleic anhydride copolymer, 15 g of 2,2,4-trimethylpropane triisophorone diisocyanate, and 200 g of Carmine 6B were placed in a kneader, and the mixture was kneaded at 100° C. for 1 hour.

To this reaction mixture, 150 g of lauryl methacrylate, 30 g of diglycidyl methacrylate and 2 g of benzoyl peroxide were added, and the mixture was polymerized at 90° C. for 6 hours.

With addition of 0.1 g of dodecylamine to this reaction mixture, an esterification reaction was carried out at 80° for 20 hours.

To this reaction mixture, 1200 g of Isopar H was added, whereby a liquid developer for use in electrophotography was prepared.

It was possible to fix images by use of this liquid developer by hot air image fixing at 80° C. when the same copying machine (Trademark "Ricopy 400i" made by Ricoh Company, Ltd.) as employed in Example 13 was used.

The OHP color reproduction was excellent and the image fixing ratio was 88%.

When copies were made by back-side image fixing at 120° C. by use of the above copying machine ("Ricopy 400i"), the image fixing ratio was 74% and the OHP reproduction was slightly inferior to that attained by the above-mentioned hot air image fixing, but was sufficient for use in practice.

The liquid developer prepared in this example is practically usable as an ink for ink-jet recording. Japanese Patent Application No. 06-159205 filed on Jun. 17, 1994, Japanese Patent Application No. 06-227274 filed on Aug. 29, 1994, Japanese Patent Application No. 06-289055 filed on Oct. 28, 1994, Japanese Patent Application No. 06-333881 filed on Dec. 16, 1994, and Japanese Patent Application No. 07-058264 filed on Feb. 23, 1995 are hereby incorporated by reference.

What is claimed is:

1. A recording method by electrically charging an ink composition and ejecting said ink composition from a pen-plotter nozzle onto an electrically charged substrate, said ink composition comprising a carrier medium and charged particles which comprise a coloring agent, and satisfying at least one condition of condition A or B: condition A that the specific charge quantity of said charged particles is in a range of 10 to 1,000 $\mu$C/g with a positive polarity or a negative polarity; or condition B that the specific resistance of said ink composition is $10^{10} \Omega$cm or more.

2. The recording method as claimed in claim 1, wherein said charged particles have an average particle size of 0.01 to 10 $\mu$m and the melt viscosity of said ink composition when dried and heated to 120° C. is in a range of 0.1 to 10,000 pa·sec.

3. The recording method as claimed in claim 1, wherein said carrier medium is selected from the group consisting of silicone oil, fatty acid ester, fluorine-containing oil, aliphatic hydrocarbon and alcohol.

4. The recording method as claimed in claim 1, wherein said coloring agent has a surface layer comprising a resin or an oil.

5. The recording method as claimed in claim 1, wherein said charged particles further comprise at least one component selected from the group consisting of a silicon-containing copolymer, a polyolefin, an olefin copolymer, rosin and a rosin-modified resin.

6. The recording method as claimed in claim 1, wherein said charged particles are spherical, fibrous or shapeless.

7. The recording method as claimed in claim 1, wherein said charged particles are toner particles prepared by the polymerization of a system comprising said coloring agent, a polymerizable monomer and a non-aqueous solvent.

8. A recording method by electrically charging an ink composition to a predetermined polarity and ejecting said charged ink composition from an ink ejecting portion in the form of a nail, a nozzle or a line-head, with the application of a voltage with a polarity which is the same as or opposite to the polarity of said charged ink composition to said charged ink composition, said ink composition comprising a carrier medium and charged particles which comprise a coloring agent, and satisfying at least one condition of condition A or B: condition A that the specific charge quantity of said charged particles is in a range of 10 to 1,000 $\mu$C/g with a positive or negative polarity; or condition B that the specific resistance of said ink composition is $10^{10} \Omega$cm or more.

9. The recording method as claimed in claim 8, wherein said charged particles have an average particle size of 0.01 to 10 $\mu$m and the melt viscosity of said ink composition when dried and heated to 120° C. is in a range of 0.1 to 10,000 pa·sec.

10. The recording method as claimed in claim 8, wherein said carrier medium is selected from the group consisting of silicone oil, fatty acid ester, fluorine-containing oil, aliphatic hydrocarbon and alcohol.

11. The recording method as claimed in claim 8, wherein said coloring agent has a surface layer comprising a resin or an oil.

12. The recording method as claimed in claim 8, wherein said charged particles further comprise at least one component selected from the group consisting of a silicon-containing copolymer, a polyolefin, an olefin copolymer, rosin and a rosin-modified resin.

13. The recording method as claimed in claim 8, wherein said charged particles are spherical, fibrous or shapeless.

14. The recording method as claimed in claim 8, wherein said charged particles are toner particles prepared by the polymerization of a system comprising said coloring agent, a polymerizable monomer and a non-aqueous solvent.

* * * * *